(12) United States Patent
Takahashi et al.

(10) Patent No.: US 7,590,597 B2
(45) Date of Patent: Sep. 15, 2009

(54) ELECTRONIC BUSINESS TRANSACTION SYSTEM

(75) Inventors: Naoki Takahashi, Yokohama (JP);
Hiromitsu Shiina, Kawasaki (JP);
Masahito Matsunawa, Kiyose (JP);
Shinichi Yamada, Tokyo (JP);
Yoshiharu Kamada, Ibaraki-ken (JP);
Tsuyoshi Miyake, Machida (JP); Akira Okamura, Yokohama (JP); Masasuke Tominaga, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/219,799

(22) Filed: Jul. 29, 2008

(65) Prior Publication Data
US 2008/0313093 A1    Dec. 18, 2008

Related U.S. Application Data

(63) Continuation of application No. 10/915,566, filed on Aug. 11, 2004, now Pat. No. 7,428,511, which is a continuation of application No. 09/496,465, filed on Feb. 2, 2000, now abandoned, which is a continuation of application No. 09/050,064, filed on Mar. 30, 1998, now Pat. No. 6,049,787.

(30) Foreign Application Priority Data

| Mar. 31, 1997 | (JP) | ................................. 09-079590 |
| Jul. 14, 1997 | (JP) | ................................. 09-187911 |
| Dec. 26, 1997 | (JP) | ................................. 09-359624 |

(51) Int. Cl.
*G06Q 40/00* (2006.01)
(52) U.S. Cl. .......................................... 705/40; 705/30
(58) Field of Classification Search .............. 705/10–44
See application file for complete search history.

(56) References Cited

U.S. PATENT DOCUMENTS 4,992,940 A    2/1991    Dworkin (Continued)

FOREIGN PATENT DOCUMENTS

| JP | 3010686 | 2/1995 |
| JP | 8096034 | 4/1996 |

OTHER PUBLICATIONS

"Protect the Validity of Your Corporate Digital Corporate Documents: Digital Notarization Increases Confidence, Prohibits Tampering", Electronic Commerce News, vol. 2, No. 4, Jan. 27, 1997.
"Surety Technologies Provides Digital Certification Functions for NetDox, a New Internet Document Delivery Service", Business Wire, Apr. 22, 1997.

*Primary Examiner*—Frantzy Poinvil
(74) *Attorney, Agent, or Firm*—Brundidge & Stanger, P.C.

(57) ABSTRACT

A center site is disposed to intervene in a business transaction achieved through a network. The center site includes an open business information database in which open business information received from member sites connected to the network is accumulated to be opened to the sites and a notarization database to keep therein contents of contracts of transactions between the sites. The center site receives a transaction request from a transaction partner site in accordance with the open business information and notifies the request to an information supply site associated therewith. The center site intervenes in a transaction resultantly accomplished between the information supply site and the transaction partner site and conducts a notarization process for the contents of contract for the transaction to accumulate the contract in a notarization database.

6 Claims, 14 Drawing Sheets

U.S. PATENT DOCUMENTS

| | | |
|---|---|---|
| 5,655,088 A | 8/1997 | Midorikawa et al. |
| 5,677,955 A | 10/1997 | Doggett et al. |
| 5,715,402 A | 2/1998 | Popolo |
| 5,732,400 A | 3/1998 | Mandler et al. |
| 5,774,883 A * | 6/1998 | Andersen et al. .............. 705/38 |
| 5,794,207 A | 8/1998 | Walker et al. |
| 5,862,223 A * | 1/1999 | Walker et al. ................. 705/50 |
| 6,026,374 A | 2/2000 | Chess |
| 6,078,906 A | 6/2000 | Huberman |
| 6,112,189 A | 8/2000 | Rickard et al. |
| 6,236,977 B1 | 5/2001 | Verba et al. |
| 6,463,418 B1 | 10/2002 | Todd |
| 6,560,581 B1 | 5/2003 | Fox et al. |
| 6,901,376 B1 * | 5/2005 | Sculler et al. ................. 705/26 |

\* cited by examiner

FIG.6

| ID | SITE NAME | FIRM | GROUP | CAPITAL | BUSINESS KIND | CHARGING AMOUNT |
|---|---|---|---|---|---|---|
| 00001 | ABC.CO.JP | ABC | A | 10 | X | 3000 |
| 00002 | DEF.CO | DEF | B | 5 | Y | 950 |
| ------ | ------ | ------ | ------ | ------ | ------ | ------ |

| ID | PASSWORD | CRYPTO-GRAPHIC KEY | AUTHENTICA-TION LEVEL |
|---|---|---|---|
| 00001 | 123 XYZ | 01286335 | ABAA |
| 00002 | 456 XYZ | 02459123 | BBBC |

| CONTRACT No. | ORDERING SITE | ORDER No. | ORDER RECEIVING SITE | ORDER RECEPTION No. | ITEM No. | QUAN-TITY | AMOUNT | DELIVERY DATE | DATE OF PAYMENT | CONTRACT DATE |
|---|---|---|---|---|---|---|---|---|---|---|
| 0001 | ABC | 0033 | DEF | 0025 | X 003 | 50 | 30,000 | 97 10 01 | 97 10 25 | 97 09 10 |

| CONTRACT No. | ORDERING SITE | ORDER RECEIVING SITE | AMOUNT | DATE OF SETTLEMENT |
|---|---|---|---|---|
| 0001 | ABC | DEF | 30,000 | 97 10 25 |

| OPEN No. | PURCHASE OR SALE | OPENING SITE | BUSINESS LIMITATION | ITEM No. | QUANTITY | AMOUNT | DATE OF DELIVERY | COMPLETED | CONTRACT No. |
|---|---|---|---|---|---|---|---|---|---|
| 0001 | PURCHASE | ABC | SAME GROUP | X 003 | 100 | 10,000 UNIT PRICE 3,000 | 97 10 15 | COMPLETED | 0003 |
| 0002 | SALE | XYZ | WITHOUT LIMITATION | Z 033 | - | - | - | | |

| | | \multicolumn{11}{c}{PURCHASING MEMBERS} |
|---|---|---|---|---|---|---|---|---|---|---|---|---|
| | | A1 | A2 | A3 | AT | B1 | B2 | BT | C1 | C2 | CT | TT |
| SELLING MEMBERS | A1 | — | A1A2 | A1A3 | A1AT | | A1B2 | A1BT | | | | A1TT |
| | A2 | A2A1 | — | A2A3 | A2AT | | | | | | | |
| | A3 | A3A1 | A3A2 | — | A3AT | | | | | | | |
| | AT | ATA1 | ATA2 | ATA3 | 0 | | ATB2 | ATBT | | | | ATTT |
| | B1 | | | | | — | | | | | | |
| | B2 | | | | | | — | | | | | |
| | BT | BTA1 | | | BTAT | | | 0 | | | | |
| | C1 | | | | | | | | — | | | |
| | C2 | | | | | | | | | — | | |
| | CT | | | | | | | | | | 0 | |
| | TT | TTA1 | | | TTAT | | | | | | | 0 |

| CASE No. | ORDERING SITE | ORDER RECEIVING SITE | URGENCY DEGREE | READ FLAG | -- |
|---|---|---|---|---|---|
| XXX | OFFICE S OF FIRM A | OFFICE U OF FIRM B | 1 | 0 | -- |
| ITEM NAME | QUANTITY OF ORDER | AMOUND OF ORDER | DELIVERY DATE | ----- | |
| TV-1 | 10 | 300,000 | 10/28 | ----- | |
| CD-3 | 5 | 100,000 | 10/28 | ----- | |
| ----- | ------ | ------ | ----- | ----- | |

| RECEIVING SITE | | INFORMATION TYPE | URGENCY DEGREE | NUMBER OF CASES |
|---|---|---|---|---|
| FIRM NAME | OFFICE | | | |
| B | U | 1 | 1 | 6 |
| B | U | 2 | 2 | 10 |
| C | W | 1 | 1 | 3 |
| C | W | 2 | 2 | 5 |
| -------- | -------- | -------- | -------- | -------- |

| ORDERING SITE | | INFORMATION TYPE | BUSINESS KIND | ITEM TYPE | PRODUCT KIND | NUMBER OF CASES |
|---|---|---|---|---|---|---|
| FIRM NAME | OFFICE | | | | | |
| A | S | 1 | ELECTRONIC APPLIANCE | | | 16 |
| A | S | 2 | | | | 30 |

| RECEIVING SITE | | TOTAL JOB CASE NUMBER | TOTAL MESSAGE CASE NUMBER |
|---|---|---|---|
| FIRM NAME | OFFICE | | |
| B | U | 33 | 20 |
| D | X | 22 | 14 |
| ------- | ------- | ------- | ------- |

| ORDERING SITE | | INFORMATION TYPE | URGENCY DEGREE | NUMBER OF CASES | UPDATE DAY AND TIME |
|---|---|---|---|---|---|
| FIRM NAME | OFFICE | | | | |
| A | S | 1 | 1 | 6 | 97/01/20 10:14 |
| A | S | 2 | 2 | 10 | 97/01/22 15:31 |
| C | W | 1 | 1 | 3 | 97/01/18 09:11 |
| ------- | ------- | ------- | ------- | ------- | ------- |

| TOTAL OPEN CASE NUMBER | TOTAL MESSAGE CASE NUMBER |
|---|---|
| 200 | 100 |

| ORDERING SITE | | INFORMATION TYPE | BUSINESS KIND | --- | No. OF CASES | UPDATE DAY AND TIME |
|---|---|---|---|---|---|---|
| FIRM NAME | OFFICE | | | | | |
| A | S | 1 | ELECTRONIC APPLIANCES | --- | 16 | 97/01/20 11:15 |
| A | S | 2 | ELECTRONIC APPLIANCES | --- | 30 | 97/01/20 10:21 |
| B | U | 1 | ELECTRONIC APPLIANCES | --- | 8 | 97/01/20 13:04 |
| ------- | ------- | ------- | ------- | --- | ------- | ------- |

ELECTRONIC BUSINESS TRANSACTION SYSTEM

RELATED APPLICATIONS

The present application is a continuation of application U.S. patent application Ser. No. 10/915,566, filed Aug. 11, 2004, now U.S. Pat. No. 7,428,511, which is a continuation of U.S. patent application Ser. No. 09/496,465, filed Feb. 2, 2000; abandoned, which is a continuation of U.S. patent application Ser. No. 09/050,064, filed Mar. 30, 1998, now U.S. Pat. No. 6,049,787, the contents of which are incorporated herein by reference.

BACKGROUND OF THE INVENTION

The present invention relates to an electronic business transaction system for exchanging information of business transactions via a communication network and the like, and in particular, to an electronic business transaction system for electronically effecting business transactions between companies and firms via a communication network.

Recently, in the processing of business transactions between firms, there have been increasingly utilized electronic business transactions in which information of transactions are electronically communicated between firms via remote terminals of the firms through a network connecting the terminals to each other. For example, an example of such an electronic business transaction system has been described in pages 83 to 92 of the "Electronic Settlement and Financial Reform" published from the Toyo Keizai Shimpo. According to the transaction system, data items of business transactions are exchanged via a network between firms in conformity with standardized rules to completely effect the business activity for the data items. Any firms to achieve business transactions send data items such as a request for an estimate for articles and an indication of order of the articles to a mail box disposed on the network or data items such as an estimate in response to the request and a notification of delivery of articles. Through the operations above, the firms concerned can communicate data items therebetween to accomplish desired business.

However, it is impossible in accordance with the prior art to carry out an operation to authenticate members who conduct transactions and/or an operation to prove the contents and time of transaction data and names of members related to the transaction. Additionally, the business transaction between firms is substantially achieved only between two firms which have been beforehand recognized as business partners, i.e., only one-to-one business transactions have been taken into consideration. That is, the conventional technology is attended with a drawback that an open transaction or open business such as an open purchase in which a large number of firms participate cannot be achieved.

Furthermore, the prior art requires each member to individually conduct management jobs including management of issued orders and accepted orders.

SUMMARY OF THE INVENTION

It is therefore an object of the present invention, which has been devised to solve the problem above, to provide an efficient business transaction system in which the desired operations are comprehensively integrated in one system to treat information necessary for business transactions in a concentrated fashion.

To achieve the object, there is provided an electronic business transaction system in which business transactions are electronically effected between firms at their sites of remote terminals connected via a network to each other, the system including a center site to intervene in business transactions achieved through the network. The center site includes an open business information database to store therein open business information which is received from sites connected to the network which offers articles for buyers in an open business and a notarization database to keep therein the contents of contracts associated with business transactions effected between the respective sites via the network. The open business information accumulated in the database can be accessed by any site linked with the network such that a request from a firm for business for an information item of open business is accepted and is then notified to the site of the pertinent information supplier. Additionally, the center site intervenes in the transaction resultantly accomplished between the information supplier site and the transaction requesting site to carry out a notarial act for the content of business contract between the partners and then accumulates the notarized contents of contract in the notarization database.

Moreover, the center site gathers information whether or not the delivery and settlement have been conducted in conformity with the contract from the related sites to store the information together with the contents of contract and then transmits a message to press for the deliver or settlement to the related sites.

Another object of the present invention is to manage, in an environment in which databases including cases of respective information source firms are distributively arranged, statuses of transmission of cases related to respective information receiver firms in a centralized and concentrated manner to avoid occurrence of business trouble.

In accordance with the present invention, there is provided a method of managing statuses of transmission of cases for transactions between firms. For each information transmission source, the status of transmission of cases related to each information receiver is stored in first storage. In response to registration of a new case from the information transmission source, the status of transmission of cases of the associated information receiver is updated. For each information receiver, the status of transmission of cases of each information source is stored in second storage. In response to an update operation of the cases from the information receiver, the status of transmission of cases of the associated information source is updated. In response to an enquiry from the information receiver, the second storage is referred to such that the statuses of transmission of cases from the respective information sources for the pertinent information receiver are transmitted to an information receiver to receive the answer to the inquiry.

If the information receiver issues a case acquisition request for the cases of transmission with indication of a particular information transmission source, cases specified as above are obtained from an associated business database to be sent to the information receiver having issued the request.

BRIEF DESCRIPTION OF THE DRAWINGS

The objects and features of the present invention will become more apparent from the consideration of the following detailed description taken in conjunction with the accompanying drawings in which:

FIG. 6 is a diagram showing an example of layout of a member information database;

FIG. 7 is a diagram showing a layout example of the authentication database;

FIG. 8 is a diagram showing an example of layout of the notarization database;

FIG. 9 is a diagram showing a layout example of a contacted amount information database;

FIG. 10 is a diagram showing an example of layout of an open business information database;

FIG. 12 is a diagram for explaining a method of netting balances within a group and between groups;

FIG. 14 is a diagram showing an example of data of cases in a case database 1311 of FIG. 13;

FIGS. 15A and 15B are diagrams showing an example of data in a case count information database 1312;

FIGS. 16A and 16B are diagrams showing an example of data in a service status database 1312;

DESCRIPTION OF THE PREFERRED EMBODIMENTS

Embodiment 1

Description will now be given in detail of an embodiment in accordance with the present invention. In this connection, the present invention is not restricted by the embodiment.

Figure 1:
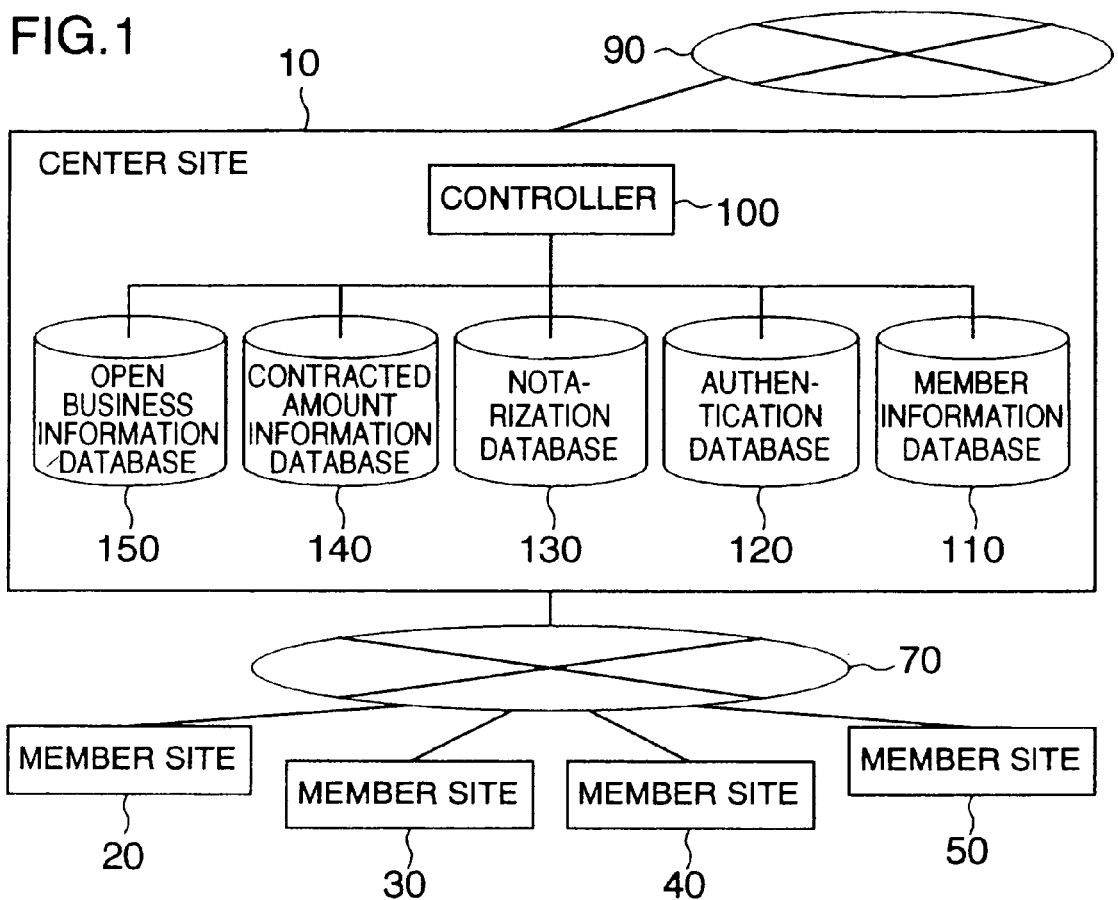
FIG. 1 is a diagram showing the configuration of an embodiment of a business transaction system in accordance with the present invention.

FIG. 1 shows the structure of an embodiment of an electronic business transaction system according to the present invention. The system includes member sites 20 to 50 which participate as members of the embodiment of the transaction system in electronic business transactions and a center site 10 to provide services to the member sites. The center site 10 is mutually connected via a network 70 to the member sites 20 to 50. Moreover, the center site 10 is coupled with an external network 90. The term "external network" represents a network other than the constituent elements of the electronic business transaction system, i.e., a network such as the Internet constituting another electronic business transaction system. Each member site can be connected via the center site 10 to the external network.

For safety and security, the network 70 is desirably a closed network using a leased line; however, there may be adopted a public telephone line and the Internet.

Each of the center and member sites includes such an information processing apparatus as a personal computer, a workstation, a main frame computer each including a communication line interface.

The center site 10 includes a member information database 110 to control information related to the respective member sites of the transaction system, an authentication database 120 to authenticate verify each member site, a notarization database 130 to notarize transaction data in the business transaction achieved between member sites, a contract amount information database 140 to manage information of the contracted amount of the business transaction between member sites, and an open business information database 150 to supply various sales and purchase information to the respective member sites. These databases are stored in an external storage of the information processing apparatus.

The center site 10 includes a controller 100 which supervises programs included therein to control the databases so as to implement various functions provided by the center site 10. The controller 100 includes a processor and a memory of the information processing apparatus and executes various software programs by the processor to achieve the functions.

The member sites 20 to 40 mutually carry out business transactions therebetween and are operated by a manufacturer, a distributor, a shipping agent, a buyer, and the like. The member site 50 includes a settling function to settle business transactions accomplished by the other member sites 20 to 40. The site 50 is operated, for example, by a bank. Although four member sites are arranged for convenience of explanation in this embodiment, there may be disposed more member sites to be connected to the system.

Communications of requests, acceptance of requests, and associated data items between the center site 10 and the member sites 20 to 50 are carried out in conformity with a protocol, for example, TCP/IP used by the network 70. The center and member sites have a function to produce a frame including request or reception data after enciphering process in accordance with a specified protocol and to send the frame to the network. These sites further include a function to receive a frame via the network and extract necessary information therefrom with deciphering process.

Figure 2:
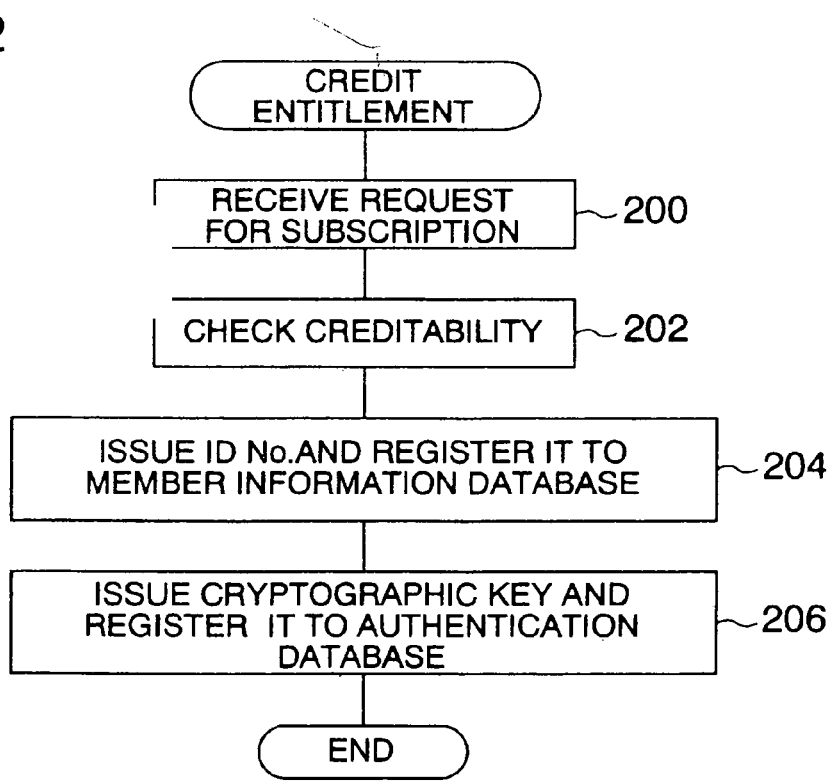
FIG. 2 is a flowchart showing a flow of operations of accepting or registering a new member site.

FIG. 2 is a flowchart of a processing flow in the center site 10 at reception of a request for subscription from a new site. Receipt of subscription is conducted by the center site 10 (step 200). The operation may be carried out, for example, by receiving an electronic mail via the external network 90. The center site 10 determines acceptance or rejection of the request for subscription in accordance with the size of enterprise, the amount of capital, and the business transaction history of the new site. The judgment may be accomplished by a human or may be automatically achieved by the center site 10 on the basis of predetermined judging criteria using a credit information database installed in the center site or another institution (step 202). After accepting subscription of the new site, the center site 10 issues an identification number which is unique in the system and a cryptographic key for encryption (steps 204 and 206) and then finally registers information of the request issuing site to the member information data base 110 and information of authentication thereof to the authentication database 120. After the credit giving operation is completed, the requesting site, i.e., the member site accesses the center site via the network 70 by use of the assigned identification number. The member and center sites communicate with each other in conformity with a cryptographic system using the cryptographic key. The encryption may be achieved in accordance with the conventional method such as private-key cryptosystem (DES) or public-key cryptosystem (RSA). The authentication may be accomplished by exchanging certificate each other in accordance with ITU-T Recommendation X. 509.

FIG. 6 shows configurations respectively of the member information and authentication databases 110 and 120.

The member information database 110 may includes, in addition to the correspondence between the identification numbers and member sites, information items such as a firm to which the member site belongs, a firm group of the site, the amount of capital, and a type of business of the firm. The information items may be transmitted from the member site to the center site at the subscription. Alternatively, when checking the grade of credit of the member site (step 202), the center site may acquire the information from another database.

In the authentication database 120, there may be stored an authentication level in addition to the identification number, the password, and the cryptographic key for the following reasons. Namely, with the provision, it is possible to set limits to the access right, a range of transaction partners, the contents of transaction, and/or the amount of transaction for databases disposed in the center site. The authentication level includes levels A to E predetermined in the system. When checking the credit of the member site, the center side determines one of the levels for the site to register the determined levels to the authentication database 120. To prevent the data from being surreptitiously viewed for wrong purposes or from being falsified by unauthorized persons, the data is encrypted before being stored in the database 120.

Figure 3:
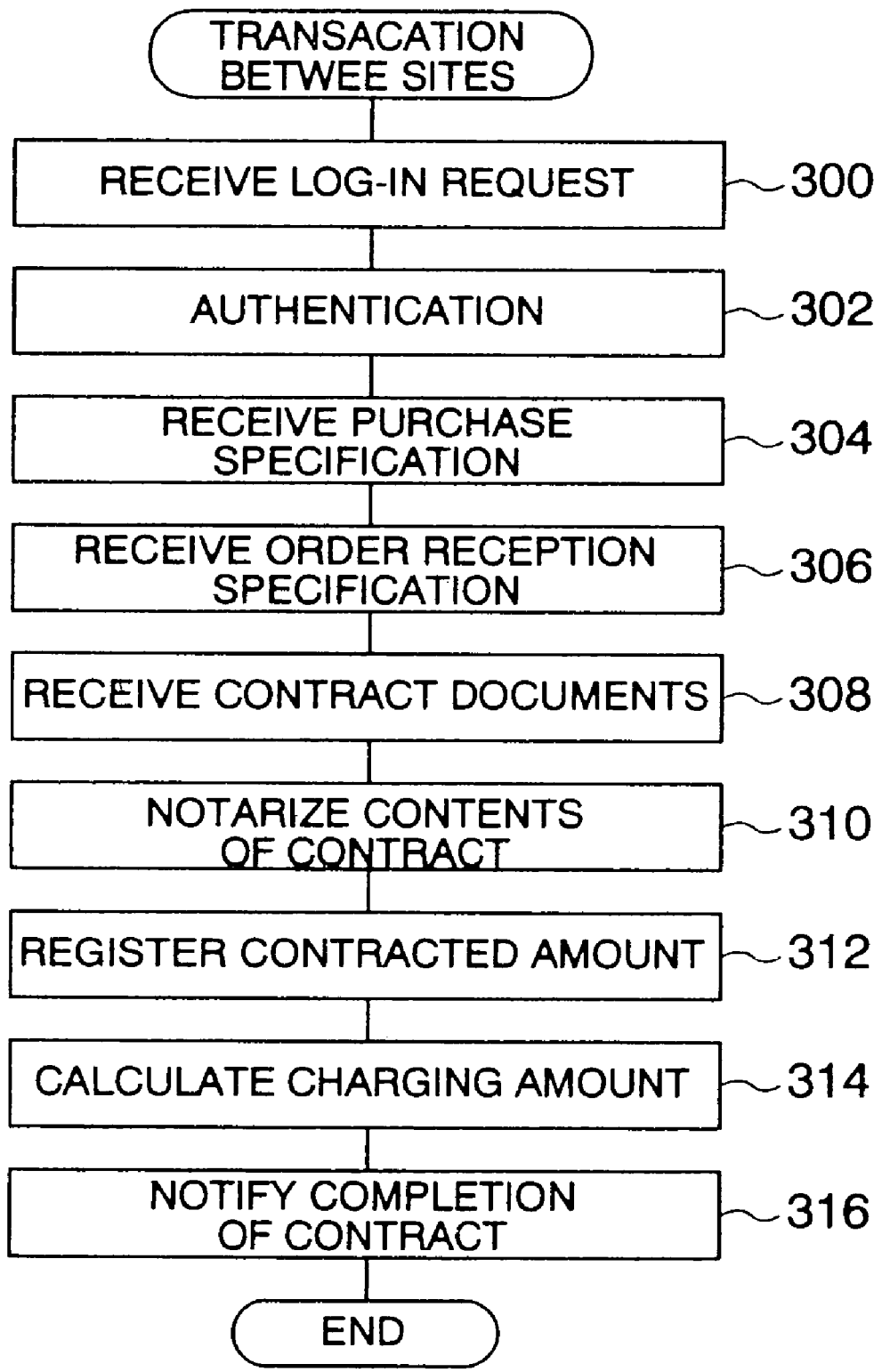
FIG. 3 is a flowchart showing a job flow of a business transaction between two member sites.

FIG. 3 is a flowchart showing an example of the job flow of achieving business transactions between two member sites. In the example, it is assumed that a member site 20 purchases articles or items from a member site 30.

First, the site 20 desiring the purchase of articles issues a login request to the center site 10. The site 10 receives the request from the site 20 (step 300). Thereafter, the center site 10 verifies an identification number and a password of the request with those registered to the authentication database 120 to authenticate the member site 20 (step 302). When the authentication of the member site 20 is finished, the center site 10 receives a purchase form from the site 20 and the sends the form to an appropriate article supplying site, i.e., the member site 30 (step 304). The purchase form includes an article number, a quantity of articles, a price, a delivery date, a member name who issues order, a member name who accepts order, and an order number.

Subsequently, the center site 10 receives an order acceptance form from the supplying site 30 and transfers the form to the ordering site 20 (step 306). The order acceptance form includes an article number, a quantity of articles, a price, a delivery date, a date of payment, a member name who issues order, a member name who accepts order, and an order number. On this occasion, when the conditions above are satisfactory for the associated partners, the center site 10 receives a contract document or form from each thereof (step 308). The contents of the contact are substantially the same as those of the order acceptance form. When the contact documents received from both sites match each other, the center site 10 conducts, to guarantee the contents of contract, an notarizating operation, for example, by electronically signing on the received contact documents and thereafter stores the documents in the notarization database 130 (step 310).

The notarization may be accomplished by the center site 10 or by an external notarization institution connected to the site 10. FIG. 8 shows structure of the notarization database 130. Furthermore, the site 10 records the contracted amount of the member sites 20 and 30 in the contracted amount information database 140 (step 312). FIG. 9 shows constitution of the database 140. The center site 10 then calculates an amount of charge for the utilization of the electronic business transaction system for each of the sites 20 and 30 to record the amount of charge of each member site in the member information database 110 (step 314). Finally, the center site 10 notifies the completion of contract to the member sites 20 and 30 to thereby terminates the sequence of operations for the business transaction (step 316).

Figure 4:
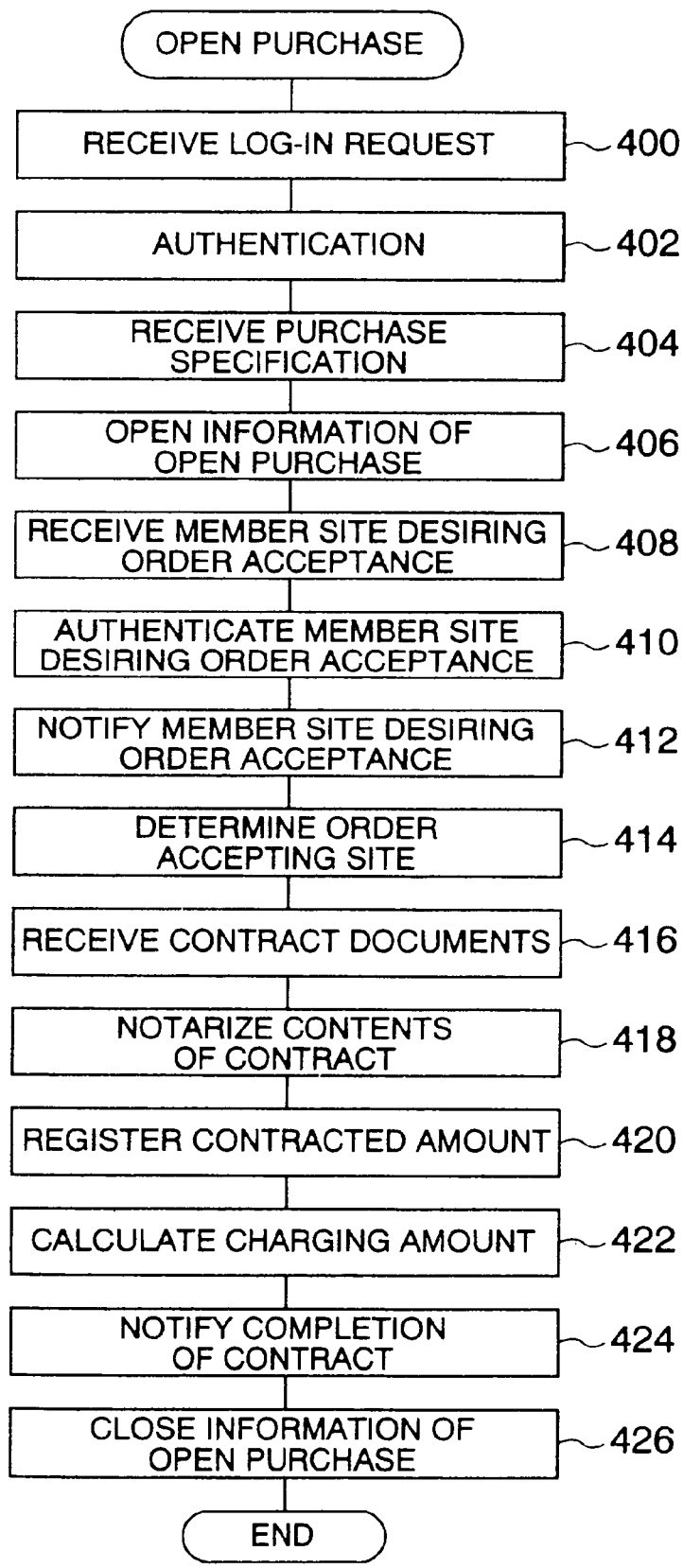
FIG. 4 is flowchart showing an operation flow of an open purchase.

FIG. 4 shows in a flowchart a flow of processing executed by the center site 10 for an open purchase effected among member sites. When a member site desiring the purchase of items (a member site 40 in this explanation) issues a login request, the center site 10 receives the login request (step 400). The site 10 authenticates the site 40 by referring to the authentication database 120 (step 402). Having authenticated the site 40, the site 10 receives a request for open purchase from the site 40 and registers the request as open business information to the open business information database 150 (step 404). FIG. 10 shows structure of the database 150. The registered information is opened to member sites satisfying the condition of the specified transaction range. The center site 10 may send the information to the member sites by mail or may send to member sites in response to a request therefrom (step 406).

When it is recognized that either one of the sites desires to accept the order, order receiving information is transmitted from the site to the center site 10 (step 408). On receiving the information, the site 10 carries out the authentication for the member site (step 410). After the authentication of the site, information related thereto is reported to the purchasing member site, i.e., the site 40 (step 412). In the site 40, the operator checks the order receiving specification, the order receiving conditions, and the like in accordance with the information of the pertinent site. Resultantly, the site 40 selects an order receiving partner from the member sites desiring the reception of order and then notifies the member site to the center site 10. Thereafter, the site 10 receives contract documents respectively from the site 40 and the order receiver site determined by the site 40 (step 416) to accomplish notarization for the transaction (step 418). Like the transaction between sites shown in FIG. 3, the registration of the amount of contract, the charging operation, and the notification of completed contract are performed (step 420 to 424). The center site 10 then set a processing completion flag to the pertinent record of the open business information database 150 (step 426). As a result, the record is not to be subjected to the open operation thereafter. When a predetermined period of time lapses, the record may be deleted or may be moved to another file for the storage thereof.

The operation of the open purchase between the member sites can also be implemented for an open purchase between various sites including external sites. In such a situation, the operation in step 406 to notify the open purchase information is also carried out for the external network 90 in addition to the network 70. Additionally, in step 408, the desire for reception of order is received via the external network 90 from external sites. In step 410, the authentication is processed for the external site in the same way as for the member sites. However, in some cases, an operation to give credit to the external site may be required in the processing.

Figure 5:
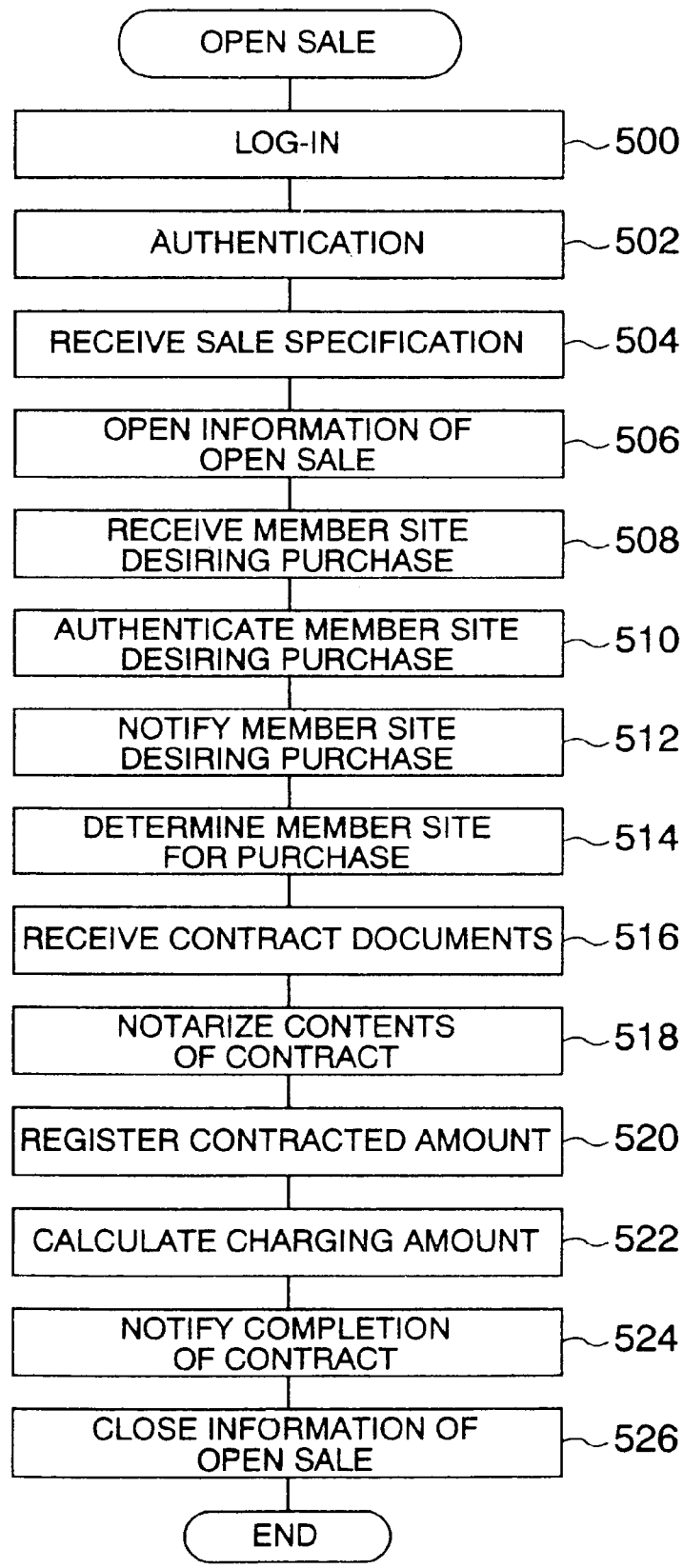
FIG. 5 is flowchart showing an operation flow of an open sale.

FIG. 5 is a flowchart showing a processing flow of an open sales operation. The processing is executed in a procedure substantially similar to that of the open purchase. A member site desiring a sales operation issues a login request via the network 70 and then the center site 10 receives the request (step 500). After the login is finished, the site 10 authenticates the member site (step 502). Receiving a sales form from the site, the center site 10 registers the contents of sales form as open business information to the open business information database 150 (step 504). The received open sales information is opened, like the open purchase information, via the network 70 to the respective member sites (step 506). When any member desiring the purchase of articles related to the information sends a request for purchase, the center site 10 receives the request (step 508). Receiving the request from each site desiring the purchase, the center site 10 authenticates the member site according to the authentication database 120 (step 510). After the authentication, the purchase request from the site is sent to the sales member site (step 510). The sales member site selects a purchasing member site from the candidate purchasers and notifies the purchaser site to the center site 10 (step 512). Processing thereafter (steps 514 to 526) is almost the same as that of the open purchase.

In this regard, although description has been given of the processing procedure of an open sales operation between member sites, an sales operation including external sites can also be carried out in the same manner as for the open purchase including external sites.

In the transactions shown in FIGS. 3 to 5, when the pertinent member site is authenticated, the center site 10 unconditionally receives the purchase and sales forms (steps 304, 404, and 504). At reception of the form, the center site 10 may check again on the basis of the authentication level in the authentication database 120 whether or not a transaction in the form is allowed for the member site, thereby accepting the purchase or sales form.

In the open purchase and sale shown in FIGS. 4 and 5, the contents of purchase and sale are opened to the member sites. By issuing an enquiry request to the center site 10, any member site can refer to the contents of the database 150. In this situation, the center site 10 examines the transaction range (FIG. 11) in the database 150 and the authentication level (FIG. 7) to resultantly supply the member only with information within a transaction range allowed for the member. In the enquiry request, the member may optionally specify a kind of article, range of amount of money, and the like such that the center site 10 appropriately classifies, selects, and sorts associated data items of the database 150 in accordance with the optional specifications to accordingly send resultant information to the members.

The controller 100 of the center site 10 may includes function described as follows.

The site 10 may carry out the netting (offset amount) operation of balance between the member sites. In the business transaction system of FIG. 1, information of the contracted amount information database 140 is transmitted to a member site having a function of settlement to achieve the settlement processing. However, the settlement operation is charged in accordance with the number of cases and the amount of money in many cases. Consequently, the settlement processing is carried out in some cases after the netting operation is finished.

Figure 11:
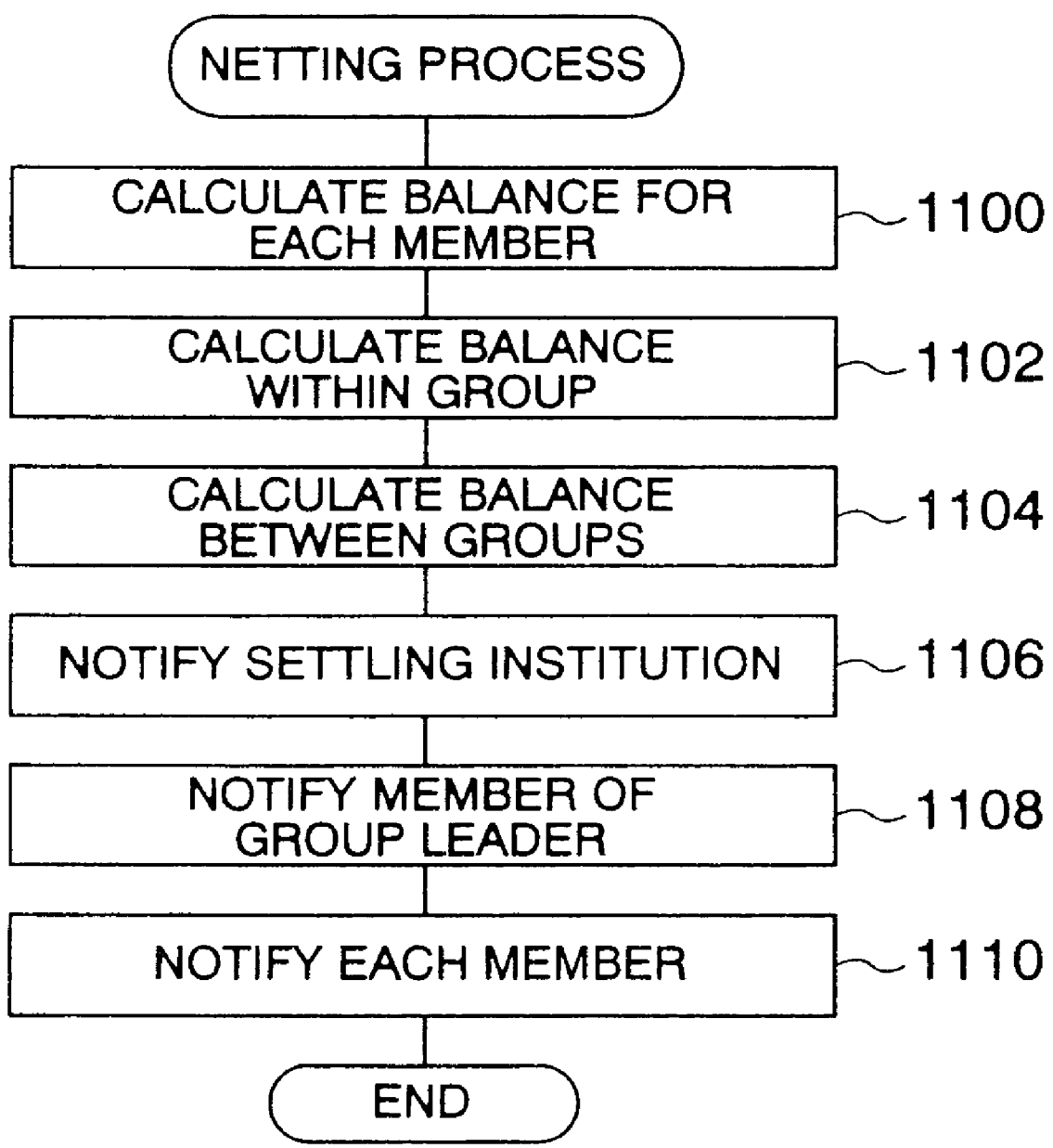
FIG. 11 is flowchart showing a flow of balance netting operation.

FIG. 11 is a flowchart showing a flow of netting operation conducted by the center site 10 to net the balance. Since member sites form groups of related firms in most cases, the netting operation is conducted in such a group or between a firm in the group and a firm not belonging to the group. In the netting operation, the contracted amount information database 140 is accessed to extract therefrom records for the netting of balances and the groups of the respective members are determined by the member information database 110 to thereby generate a table on the main memory as shown in FIG. 12.

In the processing, the balance of each member site is calculated in accordance with the contracted amount information recorded in the database 140 (step 1100). Next, according to the results of calculation, the balance is obtained between the member sites in a group (step 1102). Additionally, the balance is calculated between the groups of member sites (step 1104). Information of balances resultant from these operations is reported from the center site 10 to a member site 50 possessing a function of settlement such that the settlement is accomplished in the member site 50 (step 1106). Moreover, the center site 10 may notify the balance information sent to the site 50 to a member site of the group controlling member and related member sites (steps 1108 and 1110). The groups may be configured hierarchically and such information may be managed on the member information database 110 in the center site 10.

FIG. 12 is a diagram for explaining netting procedures in a group and between groups. In the diagram, A1 to A3, B1, B2, C1 and C2 represent member names. The vertical line stands for the supplier (selling) side and the horizontal line designates the procurer (purchasing) side. Since one member purchases and sells articles, the same member names appears along the vertical and horizontal lines. Assume that A1 to A3 configure group A, B1 and B2 form group B, and C1 and C2 constitute group C. T indicates the overall group, for example, AT denotes the entire body of group A; moreover, TT represents all groups ranging from group A to group C. In FIG. 12, the intersection between the vertical and horizontal zones indicates the amount to be paid from the member related to the vertical column to that associated with the horizontal row. For example, viewed from member A1 as a supplier, an amount of A1A2 is to be received from member A2 and an amount of A1AT is to be received in the group. In the groups, an amount of A1TT is to be received. Similarly, viewed from member A1 as a supplier, an amount of A2A1 is to be paid to member A2, an amount of ATA1 is to be paid in group a, and an amount of TTA1 is to be paid in the groups. When the balance netting is carried out in group A, member A1 need not individually pay the amounts to members A2 and A3, namely, it is only necessary to pay an amount of ATA1 to the supervisor of group A. When setting with group B, member A1 need only pay an amount of BTA1 to the supervisor of group B. When the netting operation is to be achieved between groups after the balance netting is completely achieved in each group, it is necessary, for example, group A to pay an amount of TTAT to the overall netting system. As above, all combinations of netting operations can be coped with.

The center site 10 may include a check function to determine whether or not the delivery and/or the payment have/has been conducted in conformity with the contract. In the notarization database 130, there is disposed items for the delivery date and the date for payment. It may also possible to provide an item of a payment completion flag in the contracted amount information database 140. The order issuing site and/or the order receiver site report/reports the event of delivery to the center site 10 together with the contract number. The site 10 sets the delivery date to the calculated between the groups of member sites (step 1104). Information of balances resultant from these operations is reported from the center site 10 to a member site 50 possessing a function of settlement such that the settlement is accomplished in the member site 50 (step 1106). Moreover, the center site 10 may notify the balance information sent to the site 50 to a member site of the group controlling member and related member sites (steps 1108 and 1110). The groups may be configured hierarchically and such information may be managed on the member information database 110 in the center site 10.

FIG. 12 is a diagram for explaining netting procedures in a group and between groups. In the diagram, A1 to A3, B1, B2, C1 and C2 represent member names. The vertical line stands for the supplier (selling) side and the horizontal line designates the procurer (purchasing) side. Since one member purchases and sells articles, the same member names appears along the vertical and horizontal lines. Assume that A1 to A3 configure group A, B1 and B2 form group B, and C1 and C2 constitute group C. T indicates the overall group, for example, AT denotes the entire body of group A; moreover, TT represents all groups ranging from group A to group C. In FIG. 12, the intersection between the vertical and horizontal zones indicates the amount to be paid from the member related to the vertical column to that associated with the horizontal row. For example, viewed from member A1 as a supplier, an amount of A1A2 is amount of transactions, a rate of retarded delivery, and a rate of retarded payment from the history file to rank the firms in accordance with a predetermined evaluating function.

The ranking information may be utilized and/or opened as data for the decision of business transaction, judgement for credit of the partner, and the like.

In addition to the services for business transactions between the member sites, the center site 10 provides the following services. The site 10 delivers various software articles to member sites so that the member sites access the system for desired services, conducts maintenance such as the update and management of software versions, supplies test environments of software and hardware, and lends system resources to member sites. Moreover, to help member sites access the external network 90, the site 10 provides a device to convert communication protocols and identifiers. Additionally, it is also possible that the site 10 cooperates with systems installed at member sites to supply information of the delivery date and the arrival date of ordered articles or supplies information managed by the site 10 to particular members. Due to this function, there is provided a service that the particular members can conduct jobs for other members.

Embodiment 2

This embodiment includes a system for and a method of enabling statuses of any data (cases) to be referred to in a system in which a server to manage data of orders is provided for each firm or enterprise.

Figure 13:
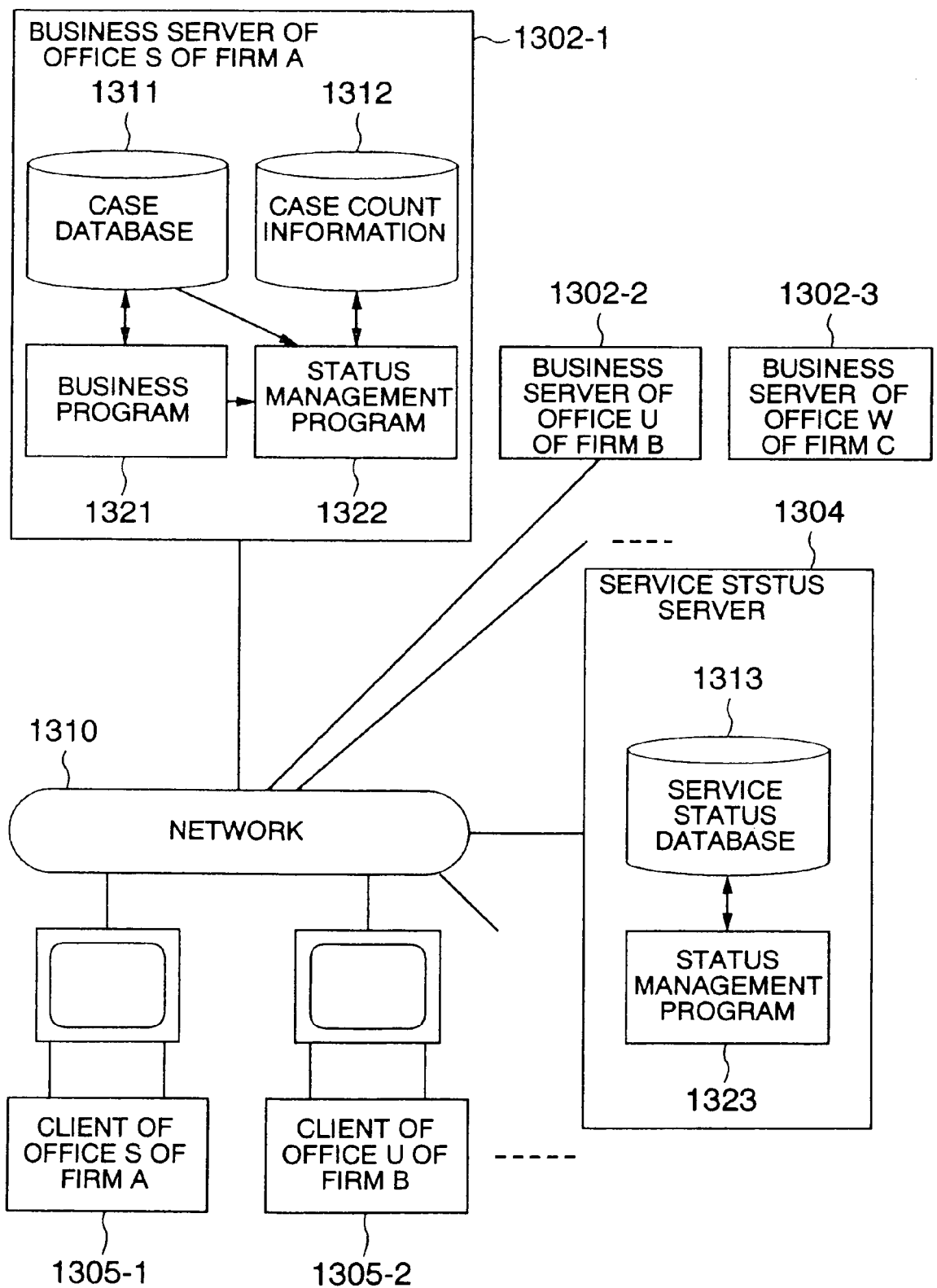
FIG. 13 is a block diagram showing the configuration of a business transaction system between firms.

FIG. 13 shows the system configuration of a part of a business transaction system for processing transactions between firms in accordance with the present invention. The configuration includes business servers 1302 which are computers to conduct business services between companies and which include a server 1303-1 of office S of firm A, a server 1302-2 of office U of firm B, and the like respectively for information transmitting firms and/or for branches or offices of a firm. The system further includes a service status server 1304 which is a computer to manage service statuses of all business servers 1302, clients 1305 which are computers to access the business servers 1302 and the service status server 1304 for desired services and which include a client 1305-1 of office S of firm A, a client 1305-2 of office U of firm B, and the like respectively for firms and/or for offices of a firm; and a network 1310 to establish connections between the business servers 1302, the service status server 1304, and the clients 1305.

The server 1302 includes a case database (DB) 1311, a case quantity information database 1312, a business program 1321, and a status management program 1322. The case database 1311 is a database disposed in a storage of the server 1302 to store therein case data for which an information receiver is specified and open cases for which specification of information receivers is not specified. The case count information database 1312 is a database arranged in a storage of the server 1302 to store therein for each receiver the number of cases for which the receivers are specified. The business program 1321 includes programs to execute job services in response to requests from the clients 1305, i.e., the business program registers case data to the case database 1311, refers to and updates case data therein, and deletes case data therefrom. The status management program 1322 includes programs which updates, at reception of registration and deletion of case data to and from the database 1312 from the program 1321, the service status, i.e., the number of cases in the database 1312 and notifies the status to the service status server 1304. The status management program 1322 transmits, on receiving an enquiry from the client 1305, the contents of the database 1312 to the client; updates the number of cases of the database 1312 when acquisition of a case is notified from the client, and reports the status to the service status server 1304. The servers 1302-2 and 1302-3 as well as the server 1302-1 are configured in a similar fashion. In the description below, the business server 1302 represents either one of these servers for the associated services.

The service status server 1304 includes a service status database 1313 and a status management program 1323. The database 1313 is disposed in a storage of the server 1304 to store therein for each receiver a table of cases for which receivers are specified such that the number of cases is stored for each receiver in the receiver table. On receiving a status report from the program 1322 of the business server 1302, the program 1323 updates the receiver table associated therewith. In response to an enquiry from the client 1305, the program 1323 edits the contents of the receiver table to transmit the edited results to the client 1305.

The client 1305 accomplishes processing of businesses in association with the business program 1321 of the server 1302. Namely, the client 1305 registers case data to the case database 1311, refers to and updates data therein, and deletes case data therefrom. In relation to the status management program 1322, the client 1305 notifies the number of cases of which the contents are referred to and that of the cases obtained. In connection with the status management program 1323 of the service status server 1304, the client 1305 refers to the pertinent receiver table in the service status database 1313. Assume in the description below that the client 1305 designates either one of the clients 1305-1, 1305-2, etc. in association with the related services.

The status management programs 1322 and 1323 are respectively stored on recording media and are sent respectively via drivers connected respectively to the business server 1302 and the service status server 1304 to be stored in the main storage of the computer; alternatively, these programs are respectively delivered via program transfer operations to the business server 1302 or the service status server 1304 to be then stored in the main storage of the computer. These programs are ready for execution in this state.

It is to be appreciated that the network 1310 collectively denotes an entire network including constituent elements such as a leased line, an integrated services digital network (ISDN), a local area network (LAN), a wide area network (WAN), and the Internet.

Firms or offices in a firm which take part in the business transaction system shown in FIG. 13 are registered as members of the system to a member management server, not shown. When the client 1305 accesses the business server 1302 or the service status server 1304, there is achieved the authentication of membership for the member. Description will be now given of an outline of the processing procedure in the overall system from when an information transmitting member register data of a case to the case database 1311 to when an information receiving member attains the case data. On receiving a request from the client 1305 related to the information transmitting member to register a case, the business program 1321 of the server 1302 registers data of the case including an identifier of the information receiver to the database 1311 and reports the registration thereof to the status management program 1322. The program 1322 updates the number of cases of the pertinent receiver in the case count information database 1312 and notifies the updated service status via the network 1310 to the status server 1304. Based on the status report, the program 1323 updates the number of cases for the pertinent transmitting source in the receiver table in the database 1313. Resultantly, the number of cases of each transmitting source is accumulated in each receiver table in the database 1313. On receiving an enquiry of the service status from the client 1305 as the information receiver, the status management program 1323 refers to the databases to edit the associated receiver table and then sends the table to the client 1305 having issued the enquiry. The client 1305 displays the receiver table on a display. In response to a request of indication from a member for the number of acquired cases and a transmitting source, the client 1305 sends a request of the number of cases to a business server 1302 of the transmitter. The business program 1321 of the server 1302 refers to the case database 1311 to attain requested data of cases for which the pertinent receiving partner is specified and then sends the data to the client 1305. When the notification of reception is sent from the client 1305 to the business server 1302, the program 1322 receives the notification, subtracts the number of obtained cases from the number of cases of the related receiver in the database 1312, and then notifies the updated service status to the server 1304. In response to the status notification, the program 1323 updates the number of cases for the pertinent transmitting source in the associated receiver table in the database 1313.

FIG. 14 shows an example of data for one case in the case database 1311 including data items such as a case number, an order issuing partner, an order receiver, a degree of urgency, and a read flag. The case number is an identifier for data of one case, the order issuing partner includes an identifier for a partner having issued an order, the order receiver is an identifier for a partner having received an order, a degree of urgency includes a flag for discrimination between an urgent case and an ordinary case, and a read flag is a flag to indicate whether or not the pertinent case has been referred (the transaction has been effected) by the order receiver. In addition, for each item ordered, there are provided such data items as an item name, a quantity of items ordered, an amount for items ordered, and a delivery data. The item name is an identifier of the items, the quantity of items ordered stands for the number of ordered items, the amount for items ordered indicates an amount assumed by the ordering partner and is referred to by the order receiver in the response to the order, and the delivery data designates a deliver date desired by the order issuing partner and is used by the order receiver in the response to the order. In this connection, the order receiver, the degree of urgency, and the read flag are missing in an open case. There are additionally disposed classifying items such as a type of business and a kind of products to identify the pertinent item.

FIGS. 15A and 15B show examples of data in the case count information database 1312. FIG. 15A shows a data example of a case for which a receiver of case data is specified. Each record of the database 1312 includes data items such as a receiver, a type of information, and a degree of urgency, and a number of cases. The receiver is an identifier of a partner to receive case data and is an identifier of the order receiving partner in a case of an ordering event. The type of information is a flag for discrimination of the case between a business case and a message (information supplying) case. The degree of urgency is a flag for discrimination of the case between an urgent case and an ordinary case. The number of cases includes the quantity of cases accumulated for each receiving partner, each type of information, and each degree of urgency. FIG. 15B shows a data example of an open case for which a receiver of case data is not specified. Each record includes data items such as an order issuing partner which is expressed by an identifier of the partner having issued case data and a type of information which is a flag for discrimination of the case between a business case and a message case. The record further includes a type of business, a kind of items, and a type of products which hierarchically indicates business types and products. Moreover, the record includes a number of cases which designates the quantity of cases accumulated for each order issuing partner, each type of information, and each type of business, each kind of items, and each type of products.

FIGS. 16A and 16B show data examples of the service status database 1313. FIG. 16A shows an example of data for which a receiver of case data is specified. The database 1313 includes a summary table storing the total number of cases of each receiving partner and detailed receiver tables disposed for respective receiving partners. Stored in the summary table are the total number of business cases and the total number of message cases for each identifier of receiving partners. Each record of the receiver table includes such data items as an identifier of a transmission source, a type of information, a degree of urgency, a number of cases, and update day and time. The update day and time includes day and time when the pertinent record is updated. The total number of each type of information in the detailed table of each receiver is equal to that of the type of information of the receiver in the summary table. FIG. 16B shows an example of data for which a receiver of case data is not specified. The database 1313 includes a summary table to store the total number of cases and detailed receiver tables disposed for respective transmitting partners. Stored in the summary table are the total number of business cases and the total number of message cases. Each record of the detailed table includes data items such as an identifier of a transmission source, a type of information, a type of business, a kind of items, a type of products, a number of cases, and update day and time. The items ranging from the transmitting source to the type of products are the same as those of FIG. 15B. The update day and time includes day and time when the pertinent record is updated.

On receiving a request for registration of case data from the client 1305 via the network 1310, the business program 1321 generates case data in accordance with data supplied from the client 1305, adds a case number thereto, and registers the resultant data to the case database 1311. The program 1321 sets the read flag of the case data to "not read". Thereafter, the program 1321 reports the new registration of case data to the status management program 1322.

Figure 17A:
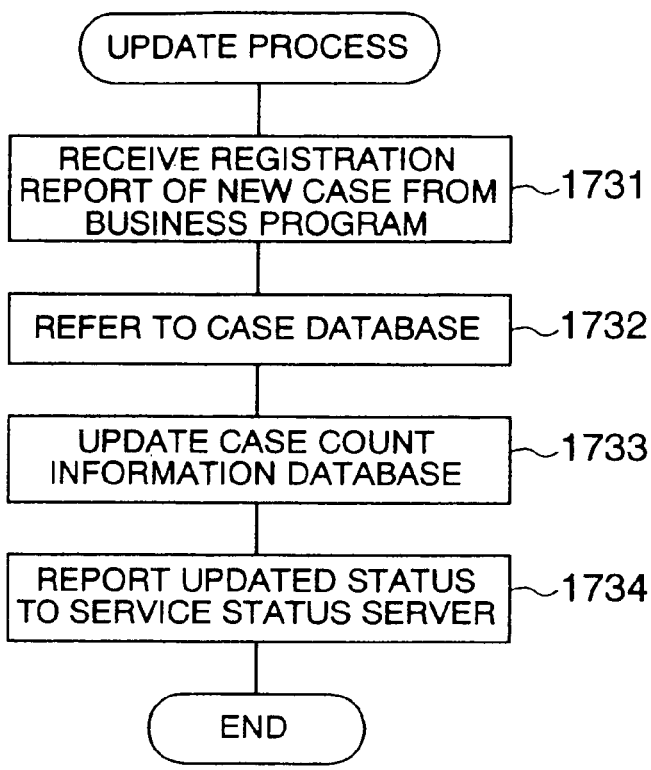
FIGS. 17A and 17B are flowcharts showing a flow of processing of a business server status management program 1322.
Figure 17B:
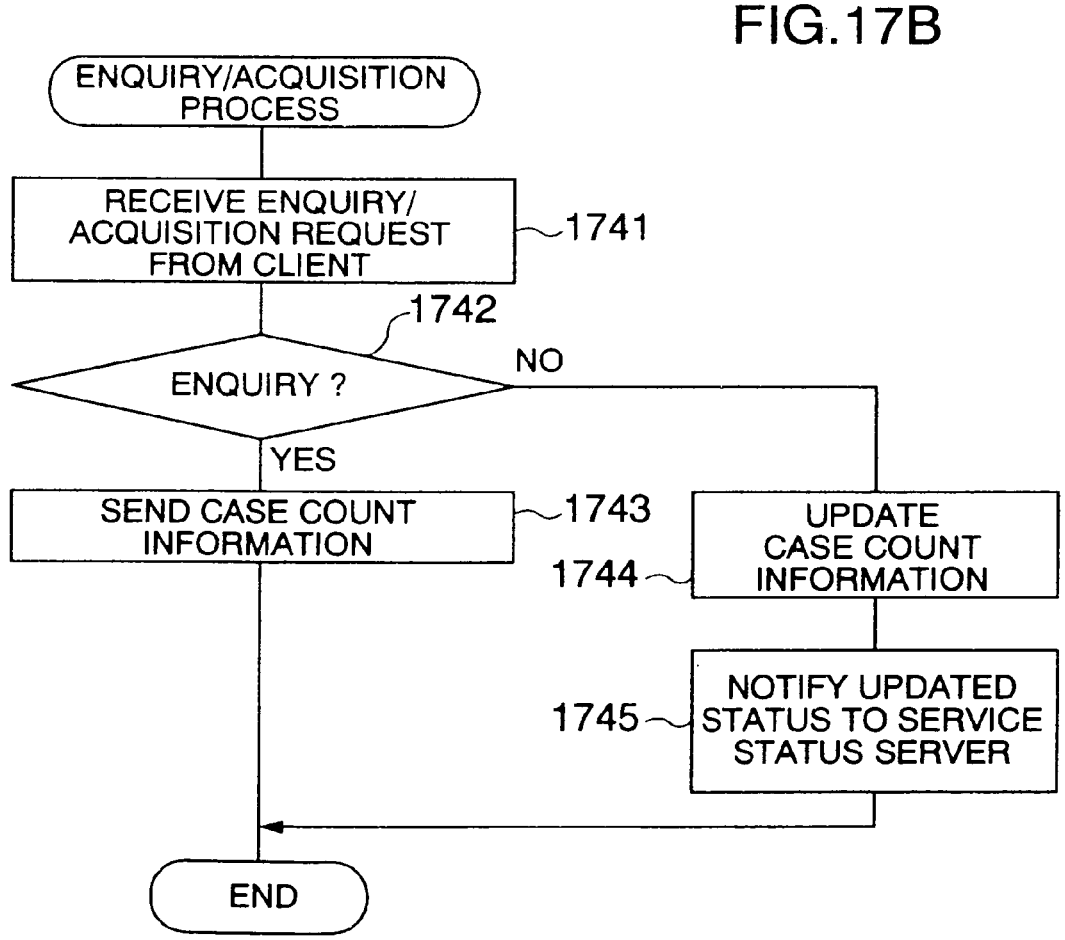

FIGS. 17A and 17B are flowcharts showing a flow of processing of the program 1322. FIG. 17A shows an operation to update the case count information database 1312 in relation to the registration of case data. When the registration report including the case number of the new case thus registered is received from the business program 1321 (step 1731), the status management program 1322 refers to the case database 1311 to acquire therefrom specified case data (step 1732), determines the type of information, and updates the database 1312 by adding one to the number cases in a record associated with the pertinent receiving partner, information type, and degree of urgency (step 1733). When a case is invalidated by, for example, a deleting operation, the program 1322 subtract one from the number of cases in a pertinent record of the database 1312. The program 1322 then sends the updated status via the network 1310 to the status management program 1323 of the service status server 1304 (step 1734). The data sent from the program 1322 to the program 1323 includes a transmission source, a receiving partner, a type of information, a degree of urgency, and a number of cases. The transmission source is an identifier of an operator (e.g., an order issuing person) who have registered the case to the database 1311. Also in a case in which an open case is to be registered, the program 1322 receives a notification of registration from the business program 1321, refers to the case database 1311 to add one to the number of cases in a record related to the associated transmission source, information type, type of business, kind of items, and type of products, and then transmits the updated status to the control program 1323. When the case is deleted or withdrawn, the program 1322 subtracts one from the number of cases in the pertinent record of the database 1312 and sends the updated status to the control program 1323.

FIG. 17B is a flowchart showing a flow of processing of the status management program 1322 in association with an enquiry or a notification of case acquisition for the database 1312 issued from the client 1305. When an enquiry or a notification of case acquisition for the database 1312 is received from the client 1305, there is conducted authentication of the user by a member management server, not shown. For an authenticated user, control is passed to the status management program 1322 of a business server 1302 specified as the destination. The program 1322 receives an enquiry or a notification of case acquisition from the client 1305 (step 1741). The enquiry or the notification of case acquisition includes an identifier of the member to which the client 1305 belongs. For a notification of acquisition, there are notified the number of cases for the type or information and for the degree of urgency of the case obtained by the receiving partner. When the member is an information transmission source to control the pertinent business server 1302 and the received data indicates an enquiry (yes in step 1742), the program 1322 refers to the database 1312 to edit the entire information of the database 1312 to send the resultant data to the client 1305 which issued the enquiry (step 1743). When the member is other than the information transmission source to control the pertinent business server 1302 and the received data indicates a notification of acquisition (no in step 1742), the program 1322 refers to the database 1312 to subtract one from each of the numbers of cases respectively associated with the type of information and the degree of urgency to thereby update the case count information database 1312 (step 1744). Subsequently, the program 1322 transmits the updated status via the network 1310 to the status management program 1323 (step 1745). The data sent from the program 1322 to the program 1323 is substantially the same as that of step 1734. For an open case, when the received item indicates an enquiry for the database 1312, the program 1322 sends the entire information of the database 1312 to the client 1305 as above. However, for a notification of acquisition, the program 1322 does not update the database 1312.

Figure 18A:
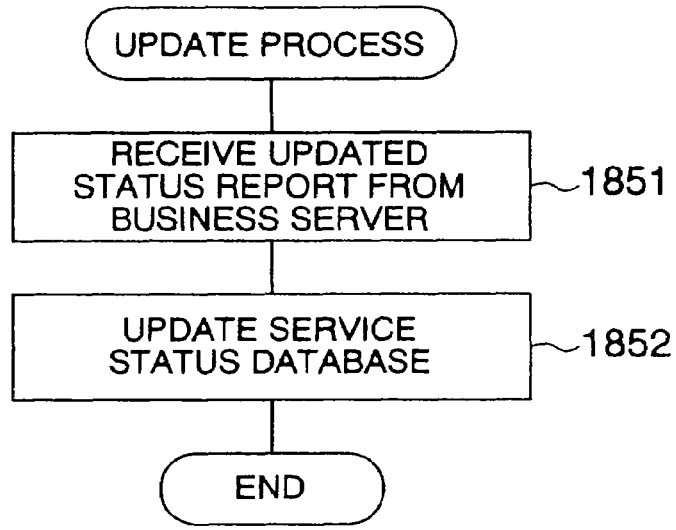
FIGS. 18A and 18B are flowcharts showing a processing flow of a service and server status management program 1322.
Figure 18B:
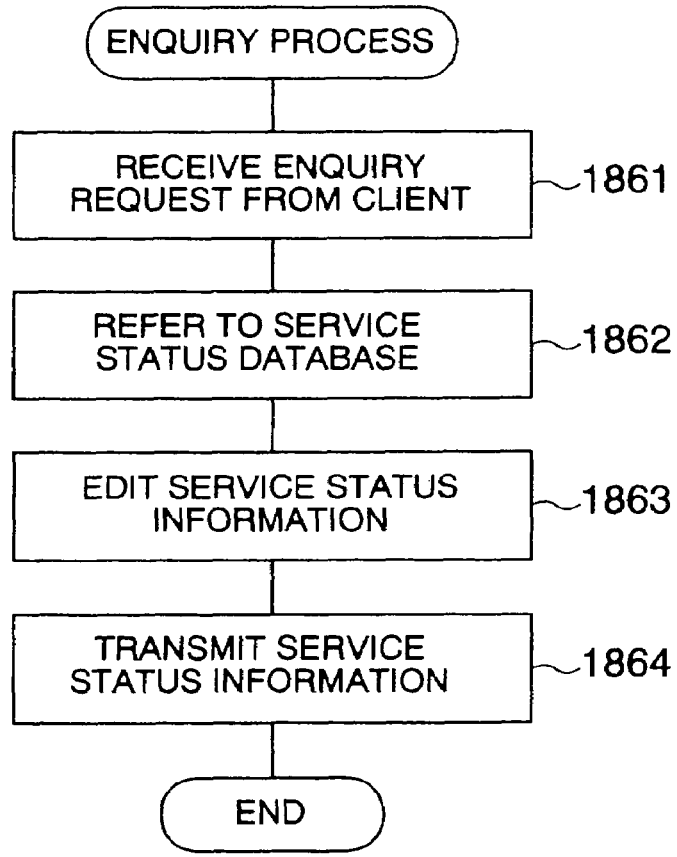

FIGS. 18A and 18B are flowcharts showing operations conducted by the status management program 1323. FIG. 18A shows processing to update the service status database 1313 in response to a report from the status management program 1322. When an updated status is received from the program 1322 (step 1851), the program 1323 updates the status database 1313 in accordance with the received data (step 1852). Namely, in a detailed table in the database 1313 related to the receiving partner, the number of cases is updated with the received value in records respectively associated with the pertinent transmission source, information type, and degree of urgency and then the update day and time are updated. Moreover, in the summary table, the total numbers respectively of job and message cases of the pertinent receiving partner are increased or decreased in association with the increase or decrease in the detailed table. When receiving a status report of an open case from the program 1322, the program 1323 updates the number of cases in the records respectively associated with the pertinent transmission source, type of information, and kind of items, and type of products as well as the update day and time. Thereafter, the program 1323 increases or decreases the total number of cases for the type of information in the summary table in relation to the increase or decrease in the detailed table.

FIG. 18B is a flowchart showing an operation flow of the program 1323 achieved on receiving an enquiry for the service status database 1313 from the client 1305. When an enquiry for the database 1313 is received from the client 1305, there is achieved authentication of the user by a member management server, not shown. If the user is assumed to be authorized, control is transferred to the program 1323 of the service status server 1304. The program 1323 receives the enquiry request from the client 1305 (step 1861). The request data includes an identifier of the member to which the client 1305 belongs. The program 1323 refers to the database 1313 to acquire therefrom the total numbers respectively of the business and message cases related to the member (information receiving partner) and a receiver table of the member (step 1862) so as to edit the obtained service status information (step 1863). In the operation, the program 1323 converts the identifier of transmitting partner of the table into a firm name and an office name and the information type flag into an associated name. Furthermore, the program 1323 adds a destination (e.g., a host name) of the business server 1302 managing the case data to each of the records in the receiver table. Finally, the program 1323 sends the resultant data via the network 1310 to the client 1305 having issued the enquiry request (step 1864). When the enquiry from the client 1305 is associated with an open case, the program 1323 entirely obtains the detailed table from the database 1313 to edit the table and then transmits the table to the client 1305.

In the client 1305, an application program displays the service status information received from the program 1323 of the server 1304 on a display. When the user indicates a transmission source, a type of information, a degree of urgency, and a number of cases to be acquired, the application program issues an enquiry to a business server 1302 as the destination of the specified record by transferring thereto the transmission source, the type of information, the degree of urgency, and the number of cases to be acquired. Receiving the enquiry data, the server 1302 conducts a retrieval operation through the case database 1311 to obtain therefrom a specified number of cases which are associated with the transmission source, the type of information, and the degree of urgency and of which the read flag is set to "not read". The server 1302 then sends the obtained cases via the network 1310 to the client 1305 and then updates the read flag of the cases to "read (already received)". The application program of the client 1305 presents the acquired case data on the display in accordance with an indication from the user. The program then transmits an acquisition report to the status management program 1322. The report includes, in addition to the identifier of the receiving partner, the numbers of attained cases respectively for the type of information and the degree of urgency of the acquired cases. However, when there is continuously executed processing to refer to and or update the case database 1311 for the obtained cases in accordance with, e.g., the type of cases, the state is set to "in operation" such that the client 1305 does not issue the acquisition report in accordance with an indication from the user. An enquiry of an open case from the client 1305 is similarly processed. Namely, at reception of the enquiry request, the server 1302 obtains from the case database 1311 the specified number of cases which are associated with the specified transmission source, the type of information, the kind of business, and the type of products and then sends the cases to the client 1305. The client 1305 displays the acquired case data on the display. However, the client 1305 does send the acquisition report to the status management program 1322.

In this connection, the method above of classifying cases in which the numbers of cases collected respectively for each receiving partner and each transmitting source has been described only as an example. There may be employed any other classifying method, for example, a method of classifying cases for each type thereof. Although the classifying method is closely associated with the present invention, the gist of the present invention resides in that there is controlled such information representing statuses of inputted cases as a list of quantitative values such as the number of cases and a list of titles of inputted cases so as to supply responses to enquiry requests from the members.

In accordance with the embodiments, a business server 1302 is arranged for each information transmission source and the service status server 1304 is disposed as an independent server. However, it is to be appreciated that the embodiments can be implemented regardless of the correspondence between the functions respectively of the business and service status servers and the servers as computer hardware in which the databases and programs to realize the functions above are stored.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed:

1. An electronic business transaction system comprising:
a plurality of member sites; and
a center site connected to the member sites via a network,
wherein each member site comprises:
(a) an information transceiver unit which transmits information to the center site and receives information from the center site via the network; and
(b) a control unit comprising:
means for transmitting purchase information or sale information to the center site via the network, the purchase information including information specifying a product and indicating that the member site desires to purchase the product, and the sale information including information specifying a product and indicating that the member site desires to sell the product;
means for transmitting a search request to the center site via the network to search the purchase information or the sale information;
means for receiving the searched information from the center site as a search result of the search request and displaying the received searched information;
means for transmitting sale proposal information or purchase proposal information to the center site via the network, the sale proposal information indicating that the member site desires to sell the product in response to the displayed purchase information and including information specifying the member site, and the purchase proposal information indicating that the member site desires to purchase the product in response to the displayed sale information and including information specifying the member site;
means for receiving information on other member site which proposes to sell or purchase the product in response to the purchase or sale information from the center site via the network, the information on the member site being searched using the member site specifying information in the proposal information received by the center site;
means for accepting an input of information on whether or not the member site determines to make a contract for the purchase or the sale with the other member sites based on the received other member site information; and
means for transmitting information that the member site determines to make the contract with the other member site to the center site,
wherein the center site comprises:
(x) an information transceiver unit which transmits information to each of the member sites and receives information from the member site via the network;
(y) a memory unit which stores the purchase information, the sale information and the information on the member sites; and
(z) a control unit comprising:
means for receiving the search request of the purchase information or the sale information from the member site via the network;
means for searching the information stored in the memory unit in response to the search request, and transmitting the searched information to the request transmitted member site to display the searched information on the member site;
means for receiving the sale proposal information or the purchase proposal information from the member site via the network;
means for searching the member site information stored in the memory unit using the information specifying the member site in the received purchase or sale proposal information;
means for transmitting the searched member site information to the member site which has transmitted the purchase or sale information; and
means for transmitting information that the contract is made between the purchase or sale proposal transmitted member site and the sale or purchase information transmitted member site to both sites via the network after receiving information that the member site determines to make the contract with the other member site from both of the member sites.

2. The electronic business transaction system according to claim 1, wherein the control unit of the center site further comprises:
means for notarizing the information that the contract is made between the member sites by adding an electronic sign, and storing the notarized information into the storing unit before transmitting information that the contract is made to both of the member sites.

3. An electronic business transaction method for performing a business transaction between member sites in a system including a plurality of member sites and a center site connected to the member sites via a network, the method comprising the steps of:

a) transmitting, by a member site which desires to purchase a product in the member sites, purchase information to the center site via the network, the purchase information including information specifying a product and indicating that the member site desires to purchase the product;

b) registering, by the center site, the received purchase information in a storing unit, and receiving, by the center site, a search request of the purchase information stored in the storing unit from a member site which desires to sell the product, searching the information stored in the memory unit in response to the search request, and transmitting the searched information to the member site which desires to sell the product to display the searched information on the member site;

c) transmitting, by the member site which desires to sell the product, sale proposal information to the center site via the network, the sale proposal information indicating that the member site desires to sell the product in response to the displayed purchase information and including information specifying the member site;

d) receiving, by the center site, the sale proposal information from the member site via the network, searching, by the center site, the member site information stored in the memory unit using the information specifying the member site in the sale proposal information, and transmitting, by the center site, the searched member site information to the member site which desires to purchase the product;

e) accepting, by the member site which desires to purchase the product, an input of information on whether or not the member site determines to make a contract for the purchase with the member site which desires to sell the product based on the received member site information, and transmitting, by the member site which desires to purchase the product, information that the member site determines to make the contract with the member site which desires to sell the product to the center site; and f) transmitting, by the center site, information that the contract is made between the member site which desires to purchase the product and the member site which desires to sell the product to both member sites via the network after receiving information that the member site determines to make the contract with the other member site from both of the member sites.

4. The electronic business transaction method according to claim 3, further comprising the step of:

notarizing, by the center site, the information that the contract is made between the member sites by adding an electronic sign, and storing the notarized information into the storing unit before transmitting information that the contract is made to both of the member sites.

5. An electronic business transaction method for performing a business transaction between member sites in a system including a plurality of member sites and a center site connected to the member sites via a network, comprising the steps of:

a) transmitting, by a member site which desires to sell a product in the member sites, sale information to the center site via the network, the sale information including information specifying a product and indicating that the member site desires to sell the product;

b) registering, by the center site, the received sale information in a storing unit, and receiving, by the center site, a search request of the sale information stored in the storing unit from a member site which desires to purchase the product, searching the information stored in the memory unit in response to the search request, and transmitting the searched information to the member site which desires to purchase the product to display the searched information on the member site;

c) transmitting, by the member site which desires to purchase the product, purchase proposal information to the center site via the network, the purchase proposal information indicating that the member site desires to purchase the product in response to the displayed sale information and including information specifying the member site;

d) receiving, by the center site, the purchase proposal information from the member site via the network, searching, by the center site, the member site information stored in the memory unit using the information specifying the member site in the purchase proposal information, and transmitting, by the center site, the searched member site information to the member site which desires to sale the product;

e) accepting, by the member site which desires to sell the product, an input of information on whether or not the member site determines to make a contract for the sale with the member site which desires to purchase the product based on the received member site information, and transmitting, by the member site which desires to sell the product, information that the member site determines to make the contract with the member site which desires to purchase the product to the center site; and f) transmitting, by the center site, information that the contract is made between the member site which desires to sell the product and the member site which desires to purchase the product to both member sites via the network after receiving information that the member site determines to make the contract with the other member site from both of the member sites.

6. The electronic business transaction method according to claim 5, further comprising the step of:

notarizing, by the center site, the information that the contract is made between the member sites by adding an electronic sign, and storing the notarized information into the storing unit before transmitting information that the contract is made to both of the member sites.

* * * * *